SUPERCONDUCTIVE D.-C. TO A.-C. CONVERTER

Filed July 5, 1961

Inventor:
William H. Meiklejohn,
by Richard C. Spear
His Attorney.

United States Patent Office 3,263,149
Patented July 26, 1966

3,263,149

SUPERCONDUCTIVE D.-C. TO A.-C. CONVERTER

William H. Meiklejohn, Scotia, N.Y., assignor to General Electric Company, a corporation of New York Filed July 5, 1961, Ser. No. 121,940
4 Claims. (Cl. 321—44)

This invention relates to apparatus for converting direct current to alternating current and more particularly to a superconductive D.-C. to A.-C. converter.

It is a principal object of this invention to provide a superconductive apparatus for converting direct current to alternating current.

Other objects and advantages will be in part obvious and in part explained by reference to the accompanying specification and drawings.

Generally, the apparatus of the present invention comprises a plurality of electromagnetic windings arranged in such a manner that the cumulative field from these elements can be sensed by an additional winding located within the field of the electromagnetic elements. The electromagnetic windings are separated from the sensor winding by a superconductive body which permits only a quantity of magnetic flux in excess of that necessary to drive the superconductive element into the intermediate state to reach the sensor winding. The sensor winding can be connected to circuitry capable of utilizing the output signal. The windings can be either normally conductive or superconductive, as desired.

Due to the Meissner effect in superconductors and the existence of a critical field, it is possible to locate a sensing element, such as a coil, in a hollow superconductive cylinder so that there is no induced voltage in the sensor due to an applied alternating magnetic field, unless the critical field is exceeded. If the critical field is exceeded during a part of the cycle, a voltage will be induced in the sensor. This is the principle of the D.-C. to A.-C. converter described in the present application.

Figure 1:
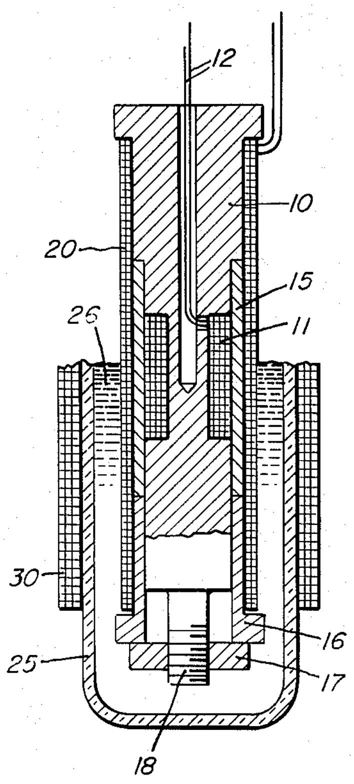
FIG. 1 is a cross-sectional view, with parts broken away for clarity, of an apparatus according to the present invention.

Referring to FIG. 1 of the drawings, one form of the apparatus comprises a core 10 which may be constructed of copper or other suitable conductive or nonconductive material and an alternating current output winding or sensor element 11, here shown as a coil. The signal derived from coil 11 can be fed to a resonant tank circuit, via wires 12, for subsequent use.

Surrounding coil 11 is a sleeve 15 which is mounted on core 10. The sleeve 15, in the configuration shown in the drawing, is of generally cylindrical shape and constructed of a material which can be rendered superconductive. The material used in the particular apparatus was lead, although any of the other materials listed in the following table may also be used.

*Table I*

| Substance | Critical Temp., $T_c$ (° K.) | Critical Field, $H_o$ (oer.) |
|---|---|---|
| $Bi_2Pt$ | 0.16 | 10 |
| Ti (99.95%) | 0.40 | 20 |
| Cd | 0.56 | 30 |
| Ru | 0.47 | 46 |
| Zr | 0.55 | 47 |
| Ga | 1.10 | 51 |
| Zn | 0.91 | 53 |
| Ga | 1.09 | 59 |
| Os | 0.71 | 65 |
| Al | 1.17 | 104 |
| $CoSi_2$ | 1.40 | 105 |
| BiSn* | 3.80 | 130 |
| Th | 1.37 | 131 |
| Tl (α) | 2.39 | 171 |
| Re | 1.70 | 201 |
| MgTl | 2.75 | 220 |
| CdSn* | 3.60 | 266 |
| In | 3.40 | 278 |
| $In_xTh_y$ | 3.20 | 280 |
| Tc | 11.20 | 300 |
| Sn | 3.74 | 305 |
| $Sb_xSn_y$ | 3.96 | 321 |
| Hg(α) | 4.16 | 413 |
| $Bi_3Sr$ | 5.62 | 530 |
| $BaBi_3$ | 5.69 | 740 |
| Pb | 7.20 | 800 |
| Ta | 4.06 | 1,000 |
| V | 5.03 | 1,310 |
| La(β) | 5.95 | 1,600 |
| U | 1.30 | 2,000 |
| $In_{.10}Pb_{.90}$Δ | 4.36 | 2,000 |
| Nb | 8.60 | 2,000 |

*Eutectic.
Δ Composition uncertain.

The sleeve 15 is held in position on core 10 by a bushing 16, the bushing 16 being urged against sleeve 15 by means of nut 17 carried on the threaded stud-like extension 18 of the core 10.

An electromagnetic D.-C. input winding 20, also shown as a coil, encloses sleeve 15 and thereby also encloses the coil 11. The purpose of coil 20 is to create a magnetic field proportional to the D.-C. input current. The magnetic field so created increases the instantaneous magnetic field applied to sleeve 15 so as to make it normally conductive during a portion of each cycle of the A.-C. excitation so that a signal is generated in sensor 11 which is a function of the D.-C. input current.

The portion of the apparatus thus far described is enclosed within a cryostat 25, part of which is broken away, so that a cooling medium such as liquid helium 26 can be used to cool the apparatus below that temperature necessary to render sleeve 15 superconducting. The particular geometry shown for the cryostat is not important, as any other configuration permitting the apparatus to be cooled to the necessary low temperature will be equally effective.

The final part of the D.-C. to A.-C. converter is an electromagnetic A.-C. excitation coil or winding 30 which surrounds the other two coils 11 and 20. The field generated by coil 30 is additive to that created by coil 20, so that the total field to which sleeve 15 is subjected is that generated by both coils 20 and 30. In the apparatus described, winding 20 is located within cryostat 25, while winding 30 is located outside of the cryostat. If preferred, both windings can either be outside of cryostat 25 or both windings can be positioned within this member. It would be desirable but not essential to make both windings 20 and 30 of a superconductive material if they are to be within the cryostat in order to reduce heating losses.

Figure 2:
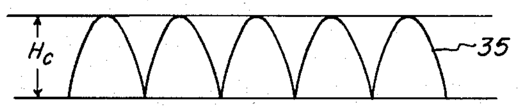
FIG. 2 is a graph showing the rectified A.-C. current signal applied to the apparatus as a function of time.

In operation, it is desirable to have a full wave rectified signal, such as that indicated by the numeral 35 in FIG. 2 of the drawings, applied to coil 30 so as to obtain the maximum output. A D.-C. signal applied to coil 20 adds to the magnetic field resulting from the A.-C. excitation coil 30 and, hence, drives the superconducting sleeve 15 into the intermediate or normally conductive state during part of the A.-C. excitation cycle.

Figure 3:
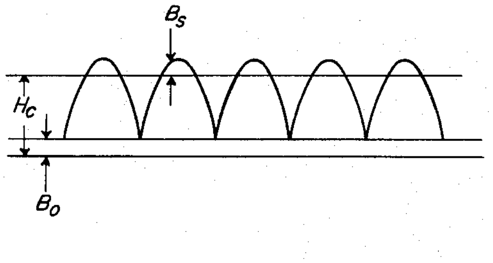
FIG. 3 is a graph similar to that of FIG. 2 showing the magnetic field to which the superconductive portion of the present apparatus is subjected.
Figure 4:
FIG. 4 illustrates the output signal coming from the apparatus.

Referring to FIGS. 2 through 4, by adjusting the A.-C. excitation in a manner that the peak magnetic field at the superconductor 15 is just equal to the critical field $H_c$, the A.-C. output coil 11 will not sense the varying magnetic field due to the supercurrents generated in superconductor 15. Therefore, its output voltage will be zero. If now a D.-C. input signal is applied to coil 20 so as to produce a flux density $B_o$ at the superconductor, as shown in FIG. 3, the A.-C. excitation field will drive the superconductor 15 into the intermediate or normally conductive state during a part of the cycle and the A.-C. output coil will sense the magnetic flux density $B_s$. If the voltage induced in the A.-C. output coil 11 is applied to a resonant tank circuit, for example, then an A.-C. signal is obtained which is a function of the applied D.-C. signal. The output signal coming from coil 11 will have the configuration shown by curve 36 in FIG. 4 of the drawings.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An apparatus for converting direct current to alternating current comprising, a D.-C. input winding, an A.-C. excitation winding mounted in a manner such that its magnetic field is cumulative to the field created by said D.-C. input winding, an inductive A.-C. output sensor mounted within the magnetic fields created by said D.-C. input winding and said A.-C. excitation winding, and a superconductive element mounted between said output sensor and said D.-C. input winding and said A.-C. excitation winding so that only magnetic flux in excess of that rendering said superconductive element normally conductive reaches said output sensor.

2. An apparatus for converting direct current to alternating current comprising, an A.-C. output coil including an inductive winding and a core, a sleeve constructed of a material capable of being rendered superconductive operatively enclosing said A.-C. output coil to prevent magnetic flux from reaching said A.-C. output coil which is not in excess of the amount required to render said superconductive sleeve normally conductive, a D.-C. input coil operably surrounding said superconductive sleeve to subject it to a magnetic field, and an A.-C. excitation coil operatively enclosing said D.-C. input coil, the magnetic field created by said A.-C. excitation coil combining with the magnetic field of said D.-C. coil to control the conductive state of said sleeve.

3. An apparatus for converting direct current to alternating current comprising, an inductive A.-C. output coil wound about a core, a sleeve constructed of a material capable of being rendered superconductive mounted on said conductive core and surrounding said A.-C. output coil, a D.-C. input coil operably surrounding said superconductive sleeve to subject it to a magnetic field, and an A.-C. excitation coil operatively enclosing said D.-C. input coil.

4. An apparatus as defined in claim 1 wherein said input and said excitation winding and said output sensor are superconducting.

References Cited by the Examiner

UNITED STATES PATENTS

| | | | |
|---|---|---|---|
| 2,666,884 | 1/1954 | Ericsson et al. | 321—45 |
| 2,914,735 | 11/1959 | Young | 332—51 |
| 3,007,057 | 10/1961 | Brennemann et al. | 307—88.5 |
| 3,098,189 | 7/1963 | Buchhold | 340—173.1 |

JOHN F. COUCH, *Primary Examiner.*

SAMUEL BERNSTEIN, LLOYD McCOLLUM, *Examiners.*

G. GOLDBERG, G. J. BUDOCK, J. J. KISSANE, *Assistant Examiners.*